US012534056B2

(12) United States Patent
Weh et al.

(10) Patent No.: US 12,534,056 B2
(45) Date of Patent: Jan. 27, 2026

(54) HYDRAULIC BLOCK FOR A SERVICE BRAKE UNIT OF A HYDRAULIC POWER BRAKE SYSTEM

(71) Applicant: Robert Bosch GmbH, Stuttgart (DE)

(72) Inventors: Andreas Weh, Sulzberg (DE); Stefan Kaserer, Ofterschwang (DE)

(73) Assignee: Robert Bosch GmbH, Stuttgart (DE)

( * ) Notice: Subject to any disclaimer, the term of this patent is extended or adjusted under 35 U.S.C. 154(b) by 375 days.

(21) Appl. No.: 18/262,248

(22) PCT Filed: Apr. 12, 2022

(86) PCT No.: PCT/EP2022/059727
§ 371 (c)(1),
(2) Date: Jul. 20, 2023

(87) PCT Pub. No.: WO2022/228887
PCT Pub. Date: Nov. 3, 2022

(65) Prior Publication Data
US 2024/0116485 A1    Apr. 11, 2024

(30) Foreign Application Priority Data

Apr. 28, 2021 (DE) ............ 10 2021 204 253.8

(51) Int. Cl.
*B60T 13/74* (2006.01)
*B60T 7/04* (2006.01)
*B60T 13/66* (2006.01)

(52) U.S. Cl.
CPC ............ *B60T 13/745* (2013.01); *B60T 7/042* (2013.01); *B60T 13/662* (2013.01)

(58) Field of Classification Search
CPC ...... B60T 13/745; B60T 7/042; B60T 13/662; B60T 8/368; B60Y 2400/81; F15B 13/0814
See application file for complete search history.

(56) References Cited

U.S. PATENT DOCUMENTS

| 10,780,868 B2 * | 9/2020 | Weh .................. B60T 8/368 |
| 2012/0177516 A1 | 7/2012 | Mayr et al. |
| 2020/0047731 A1 | 2/2020 | Reuter |
| 2020/0282968 A1 | 9/2020 | Mayr et al. |
| 2020/0339092 A1 | 10/2020 | Reuter et al. |

FOREIGN PATENT DOCUMENTS

| DE | 102012213216 A1 | 2/2013 |
| DE | 102014213732 A1 | 1/2016 |
| DE | 102016202113 A1 | 8/2017 |
| DE | 102019203308 A1 | 9/2020 |
| EP | 2883766 A1 | 6/2015 |
| KR | 20190090637 A | 8/2019 |
| WO | 2012143312 A1 | 10/2012 |

OTHER PUBLICATIONS

German Patent No. DE 102019205803 to Kloss et al published on Oct. 29, 2020.*
German Patent No. DE 102021204255 to Weh et al published on Nov. 3, 2022.*
International Search Report for PCT/EP2022/059727, Issued Jul. 8, 2022.

* cited by examiner

*Primary Examiner* — Pamela Rodriguez
(74) *Attorney, Agent, or Firm* — Norton Rose Fulbright US LLP

(57) ABSTRACT

A bore of a hydraulic block of a service brake unit of a hydraulic vehicle power brake system.

9 Claims, 8 Drawing Sheets

HYDRAULIC BLOCK FOR A SERVICE BRAKE UNIT OF A HYDRAULIC POWER BRAKE SYSTEM

FIELD

The present invention relates to a hydraulic block for a service brake unit of a hydraulic power brake system for an autonomously driving motor vehicle.

BACKGROUND INFORMATION

For autonomous driving up to Level 4 (the driver can be requested to intervene) and Level 5 (highest level, no driver required), a power brake system with redundancies is necessary which, with a probability approaching certainty, excludes a complete failure of the vehicle brake system without requiring driver intervention.

International Patent Application WO 2012/143 312 A1 describes an electrohydraulic power brake system for a motor vehicle having a service brake unit and having a brake pressure regulator. The service brake unit has a brake master cylinder that can be actuated by muscular force and a piston-cylinder unit, the piston of which is displaceable within a cylinder by means of an electric motor via a threaded drive, as a power brake pressure generator, which is connected hydraulically in parallel to the brake master cylinder. The brake pressure regulator comprises solenoid valves and in each brake circuit a hydraulic pump for wheel-specific wheel brake pressure regulation. The brake pressure regulator is connected to the service brake unit and hydraulic wheel brakes are connected to the brake pressure regulator.

German Patent Application No. DE 10 2016 202 113 A1 describes a narrow, cuboid hydraulic block for a hydraulic unit of a slip-controlled hydraulic power brake system with three connections for a brake fluid reservoir in an upper side of the hydraulic block. Below the connections, a brake master cylinder borehole passes through the hydraulic block parallel to the upper side, continuously from one side to an opposite narrow side adjoining the upper side. Below the brake master cylinder borehole, a power brake cylinder borehole passes through the hydraulic block transversely to the brake master cylinder borehole from one long side of the hydraulic block to an opposite long side, which adjoins the upper side and the two narrow sides of the hydraulic block. To generate a brake pressure by using external force, a power piston with an electric motor can be displaced in the power brake cylinder borehole via a ball screw drive. The electric motor is arranged on the outside of the hydraulic block coaxially to the power brake cylinder borehole and the ball screw drive is located—likewise coaxially to the electric motor and the power brake cylinder borehole—between the electric motor and the power piston. The electric motor and the ball screw drive form an external force drive and together with the power piston and the power brake cylinder borehole form a power brake pressure generator for the hydraulic vehicle brake system. Connections for hydraulic wheel brakes via brake lines are arranged on one of the two long sides of the hydraulic block close to the upper side at the level of the connections for the brake fluid reservoir.

SUMMARY

A hydraulic block according to the present invention is intended for a service brake unit of a hydraulic power brake system having a brake pressure regulator. Brake pressure regulation means the generation and regulation of a brake pressure in the vehicle brake system, in brake circuits of the vehicle brake system and/or in hydraulic wheel brakes of the vehicle brake system that are connected to the hydraulic block. The brake pressure regulator can in particular also comprise a slip controller. Slip controllers are, for example, anti-lock braking systems, traction control systems and/or dynamic stability control systems, for which the abbreviations ABS, TCS and/or VDC/ESP (electronic stability program) are common. Slip controllers are available and are not explained here.

The hydraulic block is used for a mechanical fastening and hydraulic connection of hydraulic components of the vehicle brake system, of brake pressure generation and/or of brake pressure regulation and/or of the slip controller. Hydraulic components of this kind are, inter alia, solenoid valves, check valves, hydraulic accumulators, damper chambers, and pressure sensors. The hydraulic components are fastened in receptacles in the hydraulic block, which usually take the form of cylindrical depressions, blind holes or through-holes, some of which have stepped diameters. "Interconnected" means that the receptacles or the hydraulic components fastened therein are connected by lines in the hydraulic block corresponding to a hydraulic circuit diagram of the vehicle brake system. However, the lines are typically but not necessarily drilled into the hydraulic block.

When equipped with the hydraulic components of the vehicle brake system or its slip controller, the hydraulic block forms the service brake unit, wherein "equipped" means that the hydraulic components are fastened in the receptacles of the hydraulic block that are provided for them in each case.

In addition, the hydraulic block has, in particular, connections for brake lines which lead to hydraulic wheel brakes of the vehicle brake system.

For autonomous driving up to Levels 4 and 5, the present invention provides for a connection of a secondary brake unit to the service brake unit. Level 4 is also referred to as highly automated driving and means that the guiding of a vehicle is permanently taken over by an electronic system and a driver is only requested to intervene when the system is no longer coping with the driving tasks. Level 5 is also referred to as full automation and does not require a driver. For this purpose, the hydraulic block of the service brake unit has connections for brake lines leading to the secondary brake unit and coming from the secondary brake unit. The secondary brake unit has a power brake pressure generator for generating a hydraulic brake pressure in the event of a failure of the power brake pressure generator of the service brake unit. The present invention can also be used for autonomous driving at lower levels and for non-autonomous driving.

The present invention includes the arrangement of the hydraulic components or their receptacles and their hydraulic interconnection in the hydraulic block.

The hydraulic block according to an example embodiment of the present invention has an upper side which is provided for mounting a brake fluid reservoir. At the upper side, the hydraulic block has one or more connections for the brake fluid reservoir.

A fastening side of the hydraulic block adjoining the upper side of the hydraulic block is designed for fastening the hydraulic block or the service brake unit to a bulkhead of a motor vehicle; that is to say, the hydraulic block equipped with the hydraulic components of the vehicle brake system. For this purpose, the hydraulic block has, for example, two standardized internally threaded holes on the fastening side, into which threaded studs or stay bolts for fastening the hydraulic block or the service brake unit to the bulkhead of the motor vehicle can be screwed. A brake master cylinder borehole is open on the fastening side of the hydraulic block, so that a brake master cylinder piston is displaceable by muscular force in the brake master cylinder borehole via a brake pedal attached to the hydraulic block opposite the bulkhead of the motor vehicle via a pedal rod, which connects the brake pedal to the brake master cylinder piston in an articulated manner.

A power cylinder borehole for generating a brake pressure by external force is mounted transversely to the brake master cylinder borehole between the upper side of the hydraulic block and the brake master cylinder borehole in the hydraulic block. The brake master cylinder borehole is therefore located below the power cylinder borehole—in other words, the brake master cylinder borehole is located on a side of the power cylinder borehole facing away from the upper side of the hydraulic block, or between the power cylinder borehole and a lower side of the hydraulic block opposite the upper side.

Connections for the connection of hydraulic wheel brakes and of the secondary brake unit by means of brake lines are arranged in a motor side of the hydraulic block according to the present invention. The motor side adjoins the upper side and the fastening side of the hydraulic block and is provided for fastening an electric motor to drive the power brake pressure generator. In this case, three connections for wheel brakes are arranged in the motor side close to a side of the hydraulic block opposite the fastening side. "Close" means at a distance of preferably no more than a diameter of the connections.

A connection for a brake line to or from the secondary brake unit is arranged in the motor side from an axis of the power cylinder borehole at an angle of approximately 45° to the upper side of the hydraulic block, obliquely upward or downward in the direction of a side of the hydraulic block opposite the fastening side. One or more connections for the secondary brake unit can also be arranged close to the lower side in the motor side of the hydraulic block.

Through-holes or blind holes in the hydraulic block, referred to herein as "lines" or "boreholes" or "cylindrical boreholes", can also be produced other than by drilling.

One embodiment of the present invention provides a receptacle for a check valve via which a brake line leading to the secondary brake unit is connected to the brake fluid reservoir, concentrically in or to one of the connections for the brake fluid reservoir.

Developments and advantageous example embodiments of the present invention are disclosed herein.

All of the features disclosed in the description and the figures can be implemented individually or, in principle, in any combination in embodiments of the present invention. Embodiments of the present invention that do not have all of the features, but rather only one or more features of an embodiment of the present invention are possible, in principle. Also possible are, for example, embodiments of the present invention in which the connections for the secondary brake unit are arranged at a location different from described.

BRIEF DESCRIPTION OF THE DRAWINGS

The present invention is explained in more detail below with reference to an example embodiment shown in the figures.

The figures are partially simplified representations.

DETAILED DESCRIPTION OF EXAMPLE EMBODIMENTS

Figure 1:
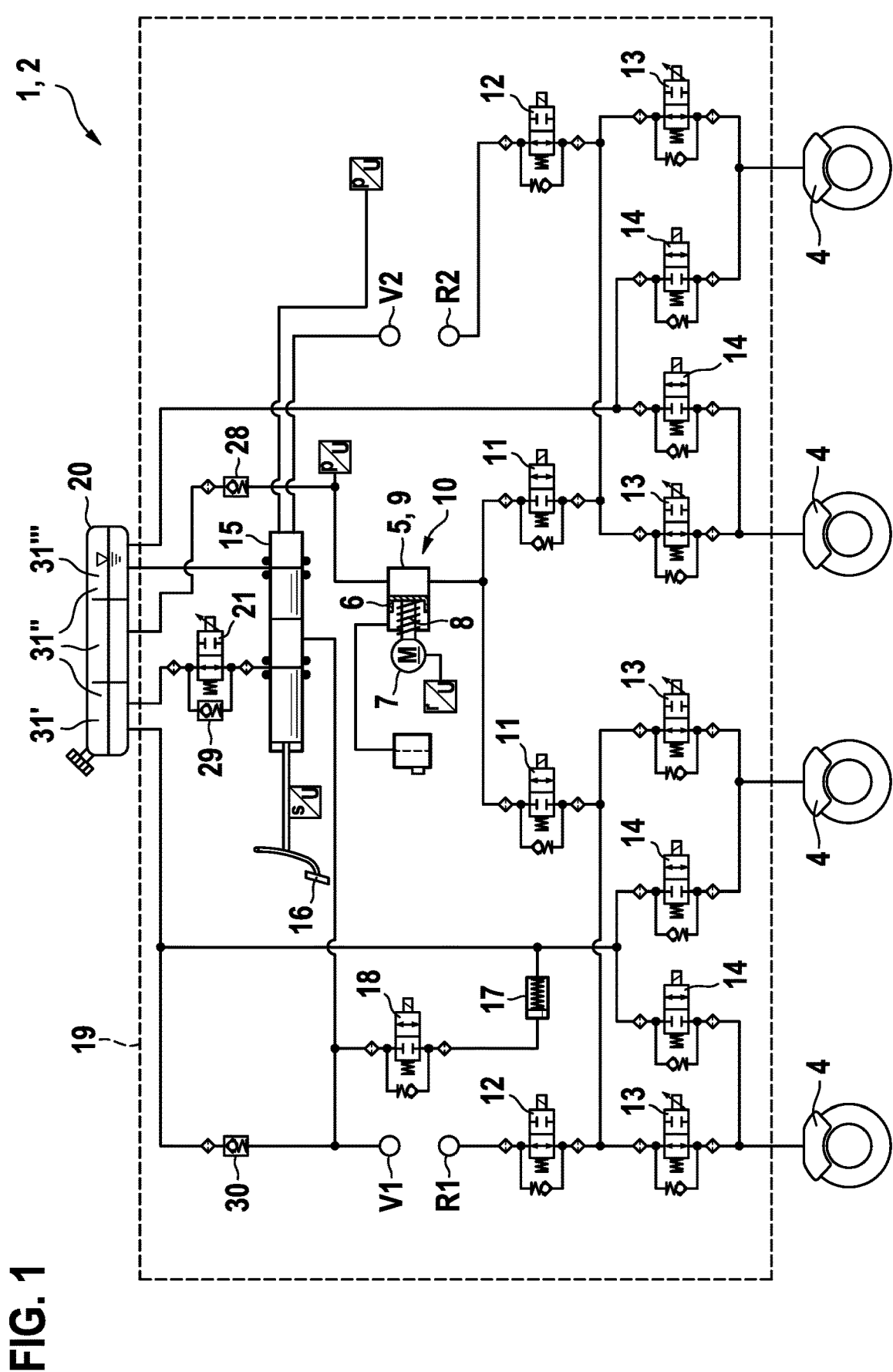
FIG. 1 shows a hydraulic circuit diagram of a service brake unit of an electrohydraulic power brake system according to an example embodiment of the present invention.
Figure 2:
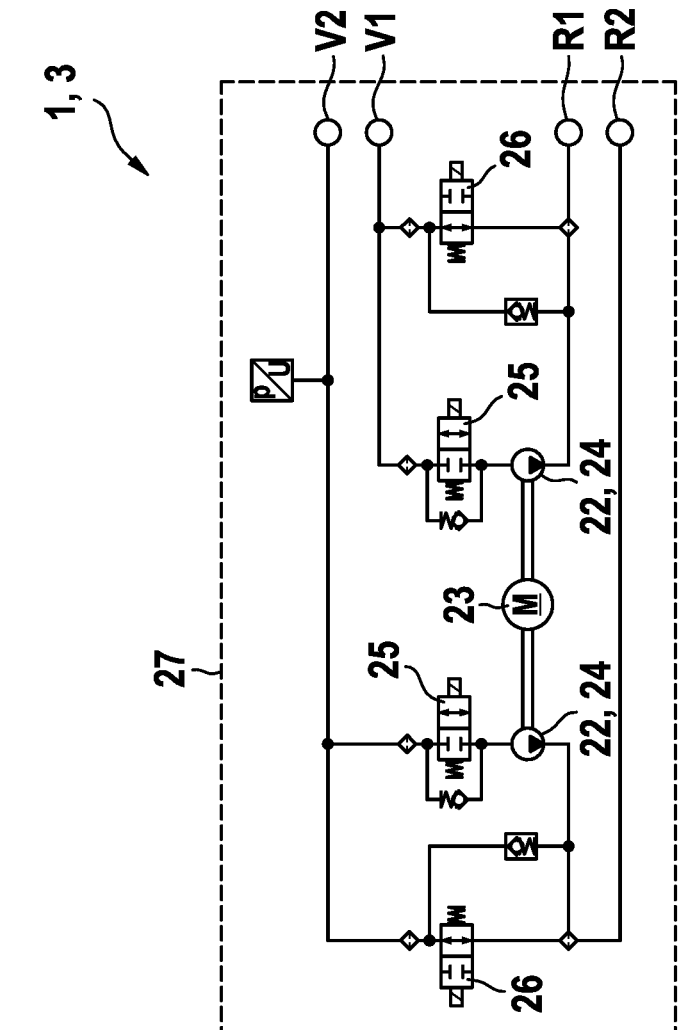
FIG. 2 shows a hydraulic circuit diagram of a secondary brake unit of the electrohydraulic power brake system from FIG. 1.

The electrohydraulic power brake system 1 according to the present invention shown in FIGS. 1 and 2 is provided for a passenger car traveling autonomously up to Level 4 or Level 5. Level 4 means autonomous driving wherein a driver can be requested to intervene, and Level 5, the highest level, means autonomous driving requiring no driver intervention.

The power brake system 1 has a service brake unit 2 and a secondary brake unit 3. The service brake unit 2 is provided for brake actuation and the secondary brake unit 3 is provided for brake actuation in the event of a fault in or failure of the service brake unit 2. Hydraulic wheel brakes 4 are connected to the service brake unit 2 via brake lines—in the exemplary embodiment four brake lines. The secondary brake unit 3 is connected via brake lines to the service brake unit 2 in such a way that the wheel brakes 4 can also be actuated with the secondary brake unit 3. The service brake unit 2 and the secondary brake unit 3 are in each case a separate unit, wherein the service brake unit 2 is fastened to a bulkhead of the passenger vehicle and the secondary brake unit 3 can be arranged at any desired location in the passenger vehicle. The brake lines which connect the secondary brake unit 3 to the service brake unit 2 are also referred to below as feed lines V1, V2 and as return lines R1, R2.

The vehicle brake system 1 according to the present invention is designed as a 2-circuit brake system and its brake units 2, 3 are designed as 2-circuit brake units. Two wheel brakes 4 are in each case assigned to one brake circuit. The secondary brake unit 3 is connected in each brake circuit to the service brake unit 2 by a feed line V1, V2 and by a return line R1, R2. Connection points of the feed lines V1, V2 and of the return lines R1, R2 in the service brake unit 2 and in the secondary brake unit 3 are designated correspondingly by V1, V2, R1 and R2.

The service brake unit 2 has a piston-cylinder unit 5, the piston 6 of which is displaceable in a cylinder 9 by an electric motor 7 via a threaded drive 8 as a rotation/translation converter transmission. The electric motor 7, the threaded drive 8 and the piston-cylinder unit 5 form a power brake pressure generator 10 of the service brake unit 2 for generating a brake pressure for service braking. Service braking is the usual and intended form of brake actuation.

The power brake pressure generator 10 is connected to the two brake circuits via service brake valves 11 between isolating valves 12 and inlet valves 13.

For each wheel brake 4, the service brake unit 2 has an inlet valve 13 and an outlet valve 14, with which wheel brake pressures in each wheel brake 4 can be regulated individually. As a result, the wheel brake pressures in the wheel brakes 4 and thus the braking forces of the wheel brakes 4 can be regulated without slippage during normal driving operation. In addition, slip control systems such as anti-lock braking and traction control, dynamic stability control systems—which are also referred to colloquially as anti-skid systems—automatic braking, distance control systems and the like are possible. Such control systems are available and are not explained in more detail here. The inlet valves 13 and the outlet valves 14 can also be regarded as wheel brake pressure regulating-valve arrangements 13, 14.

In addition to the power brake pressure generator 10, the service brake unit 2 has a brake master cylinder 15 that can be operated by muscular force and to which the wheel brakes 4 are connected via the isolating valves 12 and the inlet valves 13. The service brake unit 2 has an isolating valve 12 in each brake circuit and an inlet valve 13 and an outlet valve 14 for each wheel brake 4. The brake master cylinder 15 is used as a setpoint generator for the wheel brake pressures to be set in the wheel brakes 4 during service braking in the case of driver operation. The brake pressure is generated with the power brake pressure generator 10 not only in driver operation but also during autonomous driving. During service braking, the brake master cylinder 15 is hydraulically separated from wheel brakes 4 when the isolating valves 12 are closed.

As already stated, the brake master cylinder 15 is used as a setpoint generator for the wheel brake pressures during service braking during driver operation, whereby the brake pressure is generated with the power brake pressure generator 10 of the service brake unit 2. In the event of a failure of the power brake pressure generator 10, the brake pressure can be generated by actuating the brake master cylinder 15. This is what is referred to as secondary braking with muscular force and the brake master cylinder 15 can for this reason also be regarded as a muscular-force brake pressure generator.

So that brake fluid can be displaced from the brake master cylinder 15 and the piston of the brake master cylinder 15 and a brake pedal 16 can be moved when the isolating valves 12 are closed, the service brake unit 2 has a pedal travel simulator 17, which is connected via a simulator valve 18 to a brake circuit of the brake master cylinder 15. The pedal travel simulator 17 is a piston-cylinder unit having a spring-loaded or, for example, even a gas-pressurized piston.

In the described and illustrated embodiment of the present invention, the isolating valves 12 and the inlet valves 13 are 2/2-way solenoid valves which are open in their de-energized basic positions, and the service brake valves 11 of the power brake pressure generator 10, the outlet valves 14 and the simulator valve 18 are 2/2-way solenoid valves which are closed in their de-energized basic positions.

The hydraulic components of the service brake unit 2 of the electrohydraulic power brake system 1 according to the present invention, namely the valves 11, 12, 13, 14, 18, the power brake pressure generator 10, the brake master cylinder 15, the pedal travel simulator 17 and further components such as pressure sensors are arranged in receptacles of a hydraulic block 19 of the service brake unit 2 and are connected to one another by a bore of the hydraulic block 19 corresponding to the illustrated hydraulic circuit diagram of the vehicle brake system 1 or of the service brake unit 2.

A pressureless brake fluid reservoir 20, as from conventional brake master cylinders, is mounted on the hydraulic block 19 and connected thereto are the brake master cylinder 15 and, via a check valve 28, the power brake pressure generator 10. In one of the two brake circuits, a test valve 21 is provided between the brake fluid reservoir 20 and the brake master cylinder 15. In the exemplary embodiment, the test valve 21 is likewise a 2/2-way solenoid valve which is open in its de-energized basic position. A check valve 29 which can flow through in the direction of the brake master cylinder 15 is hydraulically connected in parallel to the test valve 21, although this is not present in all embodiments of the present invention.

The secondary brake unit 3 has a hydraulic pump 22 in each of its two brake circuits, which hydraulic pumps can be driven by a shared electric motor 23. The hydraulic pumps 22 are piston pumps, wherein other hydraulic pumps, for example gear pumps, are also possible. Together with the electric motor 23, the hydraulic pumps 22 form a power brake pressure generator 24.

Suction sides of the hydraulic pumps 22 of the secondary brake unit 3 are connected to the two brake circuits of the brake master cylinder 15 of the service brake unit 2 via suction valves 25 and the already mentioned brake lines, namely the feed lines V1, V2 by means of which the secondary brake unit 3 is connected to the service brake unit 2. Pressure sides of the hydraulic pumps 22 of the secondary brake unit 3 are connected to the two brake circuits of the brake master cylinder 15 of the service brake unit 2 via pressure valves 26 and the feed lines V1, V2. In addition, the pressure sides of the hydraulic pumps 22 of the secondary brake unit 3 are connected to the isolating valves 12 of the service brake unit 2 via brake lines, namely the return lines R1, R2, by means of which the secondary brake unit 3 is connected to the service brake unit 2. As a result, an actuation of the wheel brakes 4 is possible by generating brake pressure with the hydraulic pumps 22 of the secondary brake unit 3, which form its power brake pressure generator 24. Wheel brake pressures in the wheel brakes 4 can be regulated with the inlet valves 13 and the outlet valves 14 of the service brake unit 2, which form the wheel brake pressure regulating-valve arrangements, provided these valves 13, 14 and their controls are functional. With the hydraulic pumps 22 of the secondary brake unit 3, which form the power brake pressure generators 24, the brake pressure is generated in the event of a fault in or a failure of the service brake unit 2. Such braking is referred to as secondary braking.

In the described and illustrated embodiment of the present invention, the suction valves 25 of the secondary brake unit 3 are designed as 2/2-way solenoid valves which are closed in their de-energized basic positions and the pressure valves 26 are designed as 2/2-way solenoid valves which are open in their de-energized basic positions. In the case of secondary braking, the suction valves 25 are opened so that the hydraulic pumps 22 of the secondary brake unit 3 can suck in brake fluid from the brake fluid reservoir 20 of the service brake unit 2 via the brake master cylinder 15. Furthermore, the pressure valves 26 are closed in order to apply a brake pressure to the wheel brakes 4.

During service braking, the wheel brakes 4 are acted upon via the open pressure valves 26 of the secondary brake unit 3 and the service brake valves 11 of the service brake unit 2 to be opened in this case are acted upon with a brake pressure generated by the power brake pressure generator 10 of the service brake unit 2 or acted upon with a brake pressure generated by the power brake pressure generator 10 via the open pressure valves 26 of the secondary brake unit 3 and via the open isolating valves 12 of the service brake unit 2.

For a rapid buildup of brake pressure during secondary braking, the hydraulic pump 22 of the power brake pressure generator 24 of the secondary brake unit 3 is connected in a brake circuit via a check valve 30 to the brake fluid reservoir 20 of the service brake unit 2. In the exemplary embodiment, the check valve 30 is arranged in the hydraulic block 19 of the service brake unit 2. The hydraulic pump 22 of a primary circuit is preferably connected to the brake fluid reservoir 20 via the check valve 30, but it is also possible to connect the hydraulic pump 22 of a secondary circuit to the brake fluid reservoir 20 via a check valve 30 or of both brake circuits via a check valve 30 in each case (not shown). The primary circuit is the brake circuit which is actuated directly by the brake pedal 16 via a pedal rod.

The hydraulic components of the secondary brake unit 3, namely the hydraulic pumps 22, the valves 25, 26 and further components such as pressure sensors, are arranged in a hydraulic block 27 of the secondary brake unit 3 and are connected to one another by a bore of the hydraulic block 27 according to the illustrated hydraulic circuit diagram, which can also be referred to as an interconnection of the hydraulic components 22, 25, 26.

For each brake circuit, the brake fluid reservoir 20 has a chamber 31', 31" and additionally for the power brake pressure generator 10 of the service brake unit 2 a chamber 31", i.e., in total three chambers 31', 31", 31"'. The check valve 30, via which a hydraulic pump 22 of the secondary brake unit 3 is connected to the brake fluid reservoir 20, is connected to the same chamber 31' of the brake fluid reservoir 20 as the test valve 21. The hydraulic pumps 22 of the secondary brake unit 3 are connected to different chambers 31', 31" of the brake fluid reservoir 20. The power brake pressure generator 10 of the service brake unit 2 is connected to its own chamber 31" or to a different chamber 31" of the brake fluid reservoir 20 than the hydraulic pumps 22 of the secondary brake unit 3.

Figure 3:
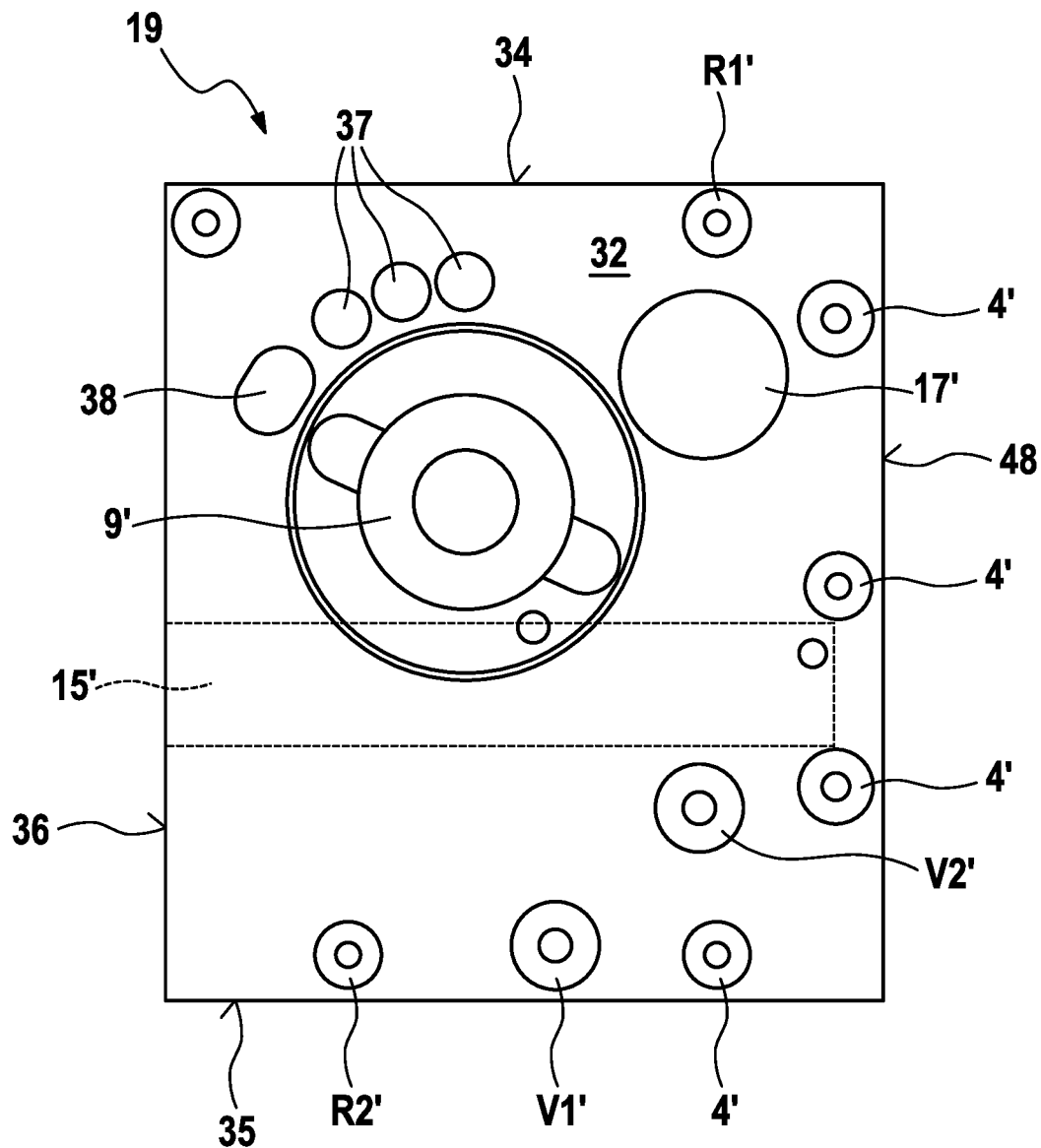
FIG. 3 shows a view of a motor side of a hydraulic block according to the present invention of the service brake unit of the vehicle brake system according to FIG. 1.
Figure 4:
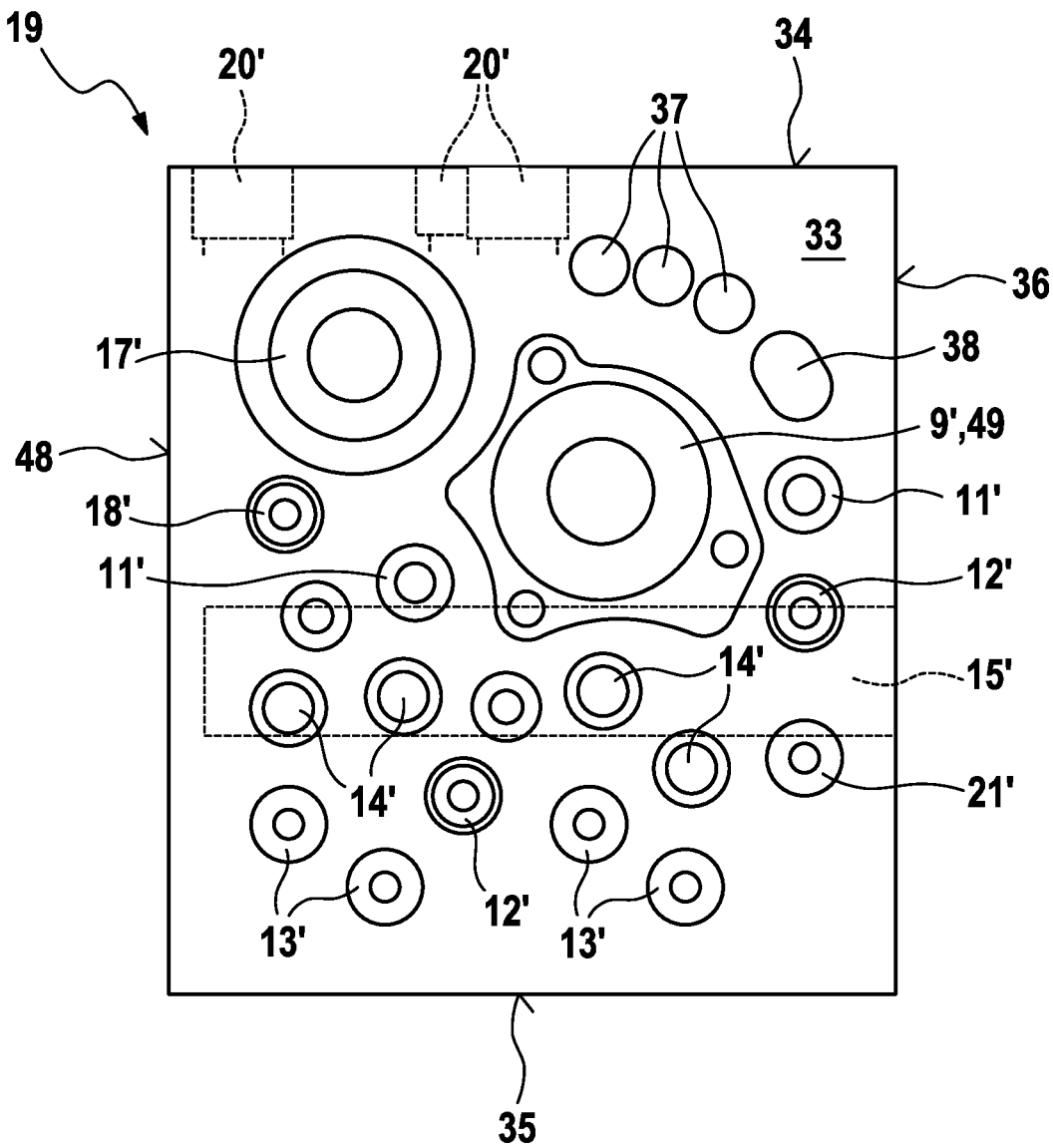
FIG. 4 shows a view of a valve side, opposite the motor side, of the hydraulic block from FIG. 3.

FIG. 3 shows a motor side 32 and FIG. 4 shows a valve side 33 of the hydraulic block 19 of the service brake unit 2. In the exemplary embodiment, the hydraulic block 19 is a flat, cuboid metal block which is used for a mechanical fastening and hydraulic interconnection of the hydraulic components of the vehicle brake system 1. Equipped with the hydraulic components, the hydraulic block 19 forms the service brake unit 2 of the vehicle brake system 1. "Flat" means that the hydraulic block 19 is approximately three to four times as wide or long as it is thick. In the exemplary embodiment, two opposite long sides of the hydraulic block 19 are virtually square and form the motor side 32 and valve side 33. In FIGS. 3 and 4, the hydraulic block 19 is drawn unequipped, i.e., without the hydraulic components.

Figure 6:
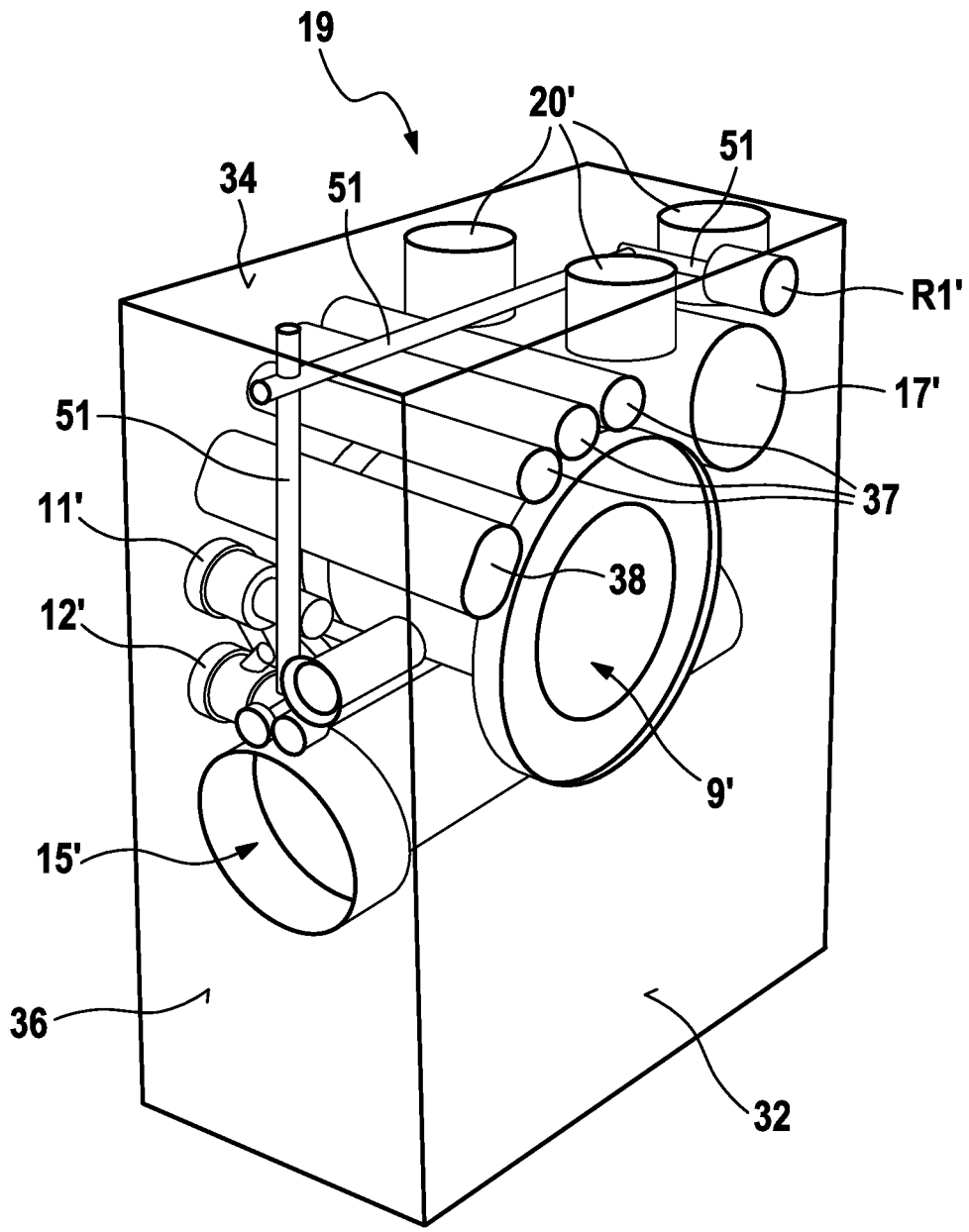

A narrow side of the hydraulic block 19, which is referred to here as the upper side 34, has three cylindrical blind holes as connections 20' for the brake fluid reservoir 20 which is arranged on the upper side 34 of the hydraulic block 19 (see FIG. 6). In this case, connection nipples at a bottom of the brake fluid reservoir 20 enter the blind holes in the hydraulic block 19, which holes form the connections 20' and are sealed there with O-rings.

In the hydraulic block 19, a brake master cylinder borehole 15', which forms the brake master cylinder 15, is arranged in parallel with the upper side 34 and centrally between the motor side 32 and the valve side 33. In FIGS. 3 and 4 the brake master cylinder borehole 15' is denoted by dashed lines. In the exemplary embodiment, it is located slightly below a center of the hydraulic block 19 between the upper side 34 and an opposite lower side 35 of the hydraulic block 19, so that the brake master cylinder borehole 15' abuts approximately tangentially a central plane of the hydraulic block 19 between the upper side 34 and the lower side 15.

A power cylinder borehole 9', which forms the cylinder 9 of the power brake pressure generator 10, is arranged in the motor side 32 of the hydraulic block 19 so as to be perpendicular to the brake master cylinder borehole 15' and projects on the valve side 33 as a kind of dome 49. The power cylinder borehole 9' is located slightly above the brake master cylinder borehole 15'—in other words, between the brake master cylinder borehole 15' and the upper side 34 of the hydraulic block 19. The power cylinder borehole 19 passes close by the brake master cylinder borehole 15'. It is arranged somewhat off-center in the direction of a fastening side 36 of the hydraulic block 19.

The electric motor 7 of the power brake pressure generator 10, which is not shown in FIG. 3, is arranged coaxially to the power cylinder borehole 9' on the outside of the motor side 32 of the hydraulic block 19. A planetary gear as a reduction gear and the threaded drive 8, which in the exemplary embodiment is a ball screw drive, are arranged coaxially to the power cylinder borehole 9' between the electric motor 7 and the piston 6 of the power brake pressure generator 10 (not shown in FIG. 3)

The fastening side 36 is a narrow side of the hydraulic block 19, where the brake master cylinder borehole 15' is open. The fastening side 36 adjoins the upper side 34, the lower side 35, the motor side 32 and the valve side 33 and is provided for fastening the hydraulic block 19 to a bulkhead of a motor vehicle (not shown). The hydraulic block 19 is fastened to the bulkhead of the motor vehicle in such a way that the upper side 34 with the brake fluid reservoir 31 is at the top. The brake master cylinder borehole 15' is open on the fastening side 36 of the hydraulic block 19, so that a brake master cylinder piston is displaceable in the brake master cylinder borehole 15' by means of a foot brake pedal which is fastened to an opposite side of the bulkhead via a pedal rod which connects the brake master cylinder piston in an articulated manner to the foot brake pedal.

A cylinder borehole 17' of the pedal travel simulator 17 is arranged in the valve side 33 of the hydraulic block 19 in parallel with the power cylinder borehole 9' and perpendicular to the brake master cylinder borehole 15'. In the exemplary embodiment, the cylinder borehole 17' is located between the brake master cylinder borehole 15' and the upper side 34 of the hydraulic block 19 and closer to the upper side 34 than to the brake master cylinder borehole 15' and between the power cylinder borehole 9' and a narrow side 48 of the hydraulic block 19 which is opposite the fastening side 36.

Receptacles for the solenoid valves 12, 13, 14, 18 and receptacles for further components such as pressure sensors are arranged in the valve side 33 of the hydraulic block 19. The receptacles, which are designated in FIG. 4 by a prime (') added to the reference number of the relevant solenoid valve or other component, are cylindrical, partially diametrically stepped depressions or blind holes in the hydraulic block 19. The hydraulic components are inserted into the receptacles and caulked circumferentially in a pressure-tight manner. Projecting from the valve side 33 of the hydraulic block 19 are hydraulic portions, which form the actual valves, located in the receptacles, armatures and magnetic coils of the solenoid valves 12, 13, 14, 18, which are accommodated in a valve dome.

The hydraulic block 19 of the service brake unit 2 is drilled corresponding to the hydraulic circuit diagram shown in FIG. 1. "Drilled" or "bore" is understood to mean the cylinder boreholes arranged in the hydraulic block 19, receptacles for the solenoid valves and connection boreholes, and also the boreholes forming lines connecting them in accordance with the hydraulic circuit diagram. The hydraulic block 19 is drilled in a Cartesian manner, i.e., the boreholes, receptacles, connections, lines etc. are arranged in the hydraulic block 19 in parallel with and perpendicular to one another and to the sides and edges of the hydraulic block 19. This does not exclude individual, obliquely extending lines and boreholes.

The secondary brake unit 3 is connected by four brake lines, the two feed lines and the two return lines, and the four wheel brakes 4 are likewise connected by brake lines to the hydraulic block 19 of the service brake unit 2. For the connection, the hydraulic block 19 has blind holes, which are referred to here as connections V1', V2', R1', R2', 4'. The connections V1', V2', R1', R2', 4' are arranged in the motor side 32 of the hydraulic block 19. The brake lines are fastened in a pressure-tight manner to the connections with press-in nipples (not shown) using so-called self-clinching technology. The connection of the brake lines is also possible, for example, with screw nipples.

A line 51 designed as a borehole connects the connection R1' for the return line R1 of the primary circuit to the receptacle 12' for the isolating valve 12. As can be seen in FIG. 6, this line 51 leads coaxially from the base of the connection R1' for the return line R1 to a center of the hydraulic block 19 between the motor side 32 and the valve side 33 and then after a bend in the direction of the fastening side 36 onward in a central plane of the hydraulic block 19 in the center between the motor side 32 and the valve side 33 until after a further bend close to the fastening side 36 it leads downward in the direction of the brake master cylinder borehole 15', from where the line 51 opens coaxially into the receptacle 12' for the isolating valve 12 after a further bend.

Figure 7:
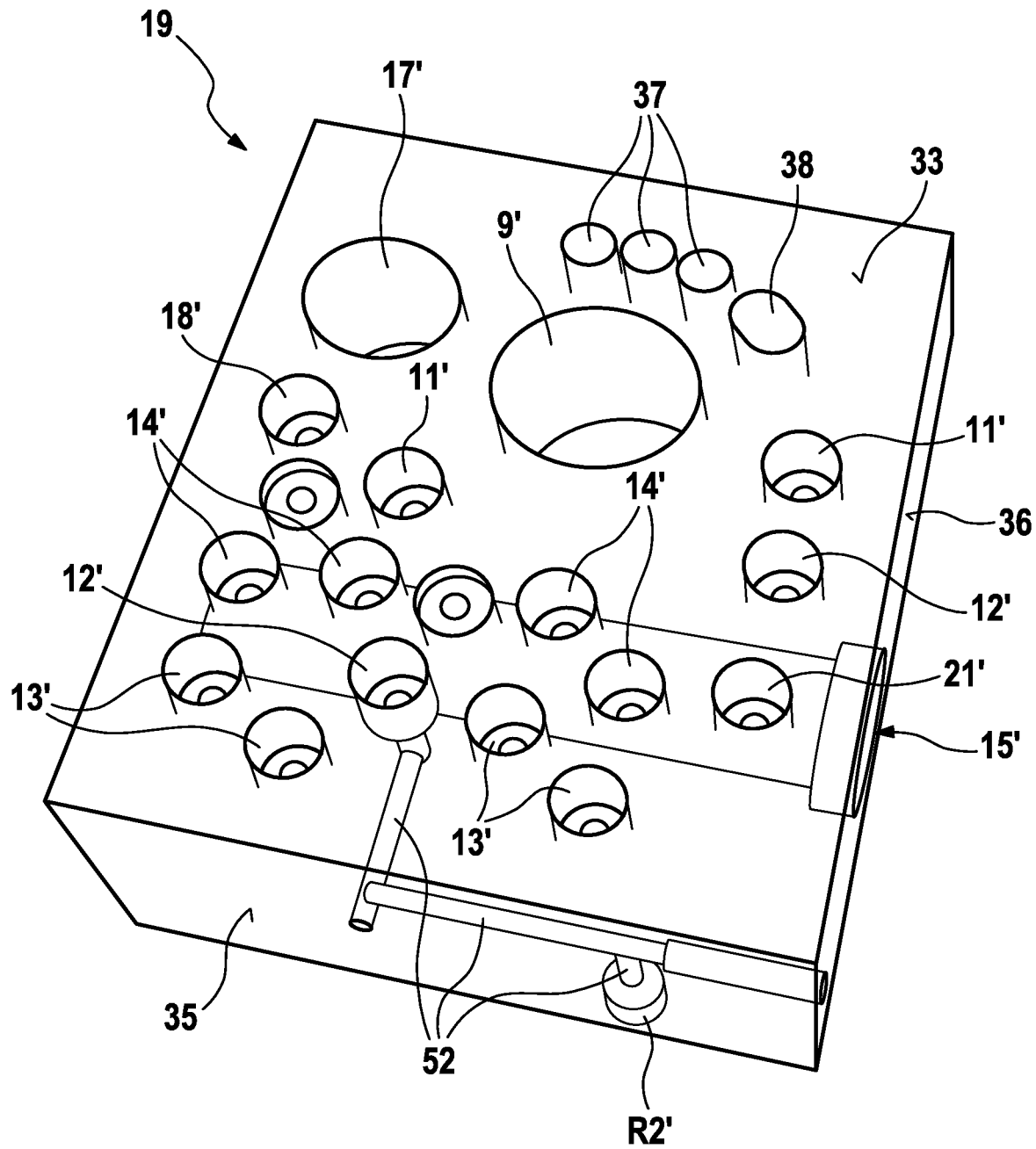

As shown in FIG. 7, from the connection R2' for the return line R2 of the secondary circuit, a line 52 likewise leads in the central plane of the hydraulic block 19 between the motor side 32 and the valve side 33 parallel to the lower side 35 of the hydraulic block 19 in the direction of the narrow side 48 opposite the fastening side 36 and after a bend leads upward to the receptacle 12' for the isolating valve 12.

In the motor side 32 three connections 4' for brake lines leading to three wheel brakes 4 are arranged along the narrow side 48 opposite the fastening side 36, and in the motor side 32 a connection 4' for a fourth wheel brake 4 is arranged away from the narrow side 48 and close to the lower side 35 of the hydraulic block 19. "Close" means at a distance no greater than a radius of the relevant connection.

Two connections R2', V1' for the secondary brake unit 3 are likewise arranged close to the lower side 35 and two further connections V2', R1' from an axis of the power cylinder borehole 9' are arranged offset in the hydraulic block 19 at an angle of approximately 45° in the direction of the upper side 34 and in the direction of the lower side 35 and in the direction of the narrow side 48 opposite the fastening side 36.

Between the power cylinder borehole 9' and the upper side 34, three through-holes which run from the motor side 32 right through to the valve side 33 are arranged in the hydraulic block 19 as motor connection boreholes 37 for a power supply of the electric motor 7 of the power brake pressure generator 10. The motor connection boreholes 37 are arranged in the hydraulic block 19 on an imaginary arc around the power cylinder borehole 9' between the power cylinder borehole 9' and the upper side 34. A signal borehole 38 for control lines and/or signal lines to or from the electric motor 7 in the hydraulic block 19 is also arranged on the imaginary arc on which the motor connection boreholes 37 are arranged.

Figure 5:
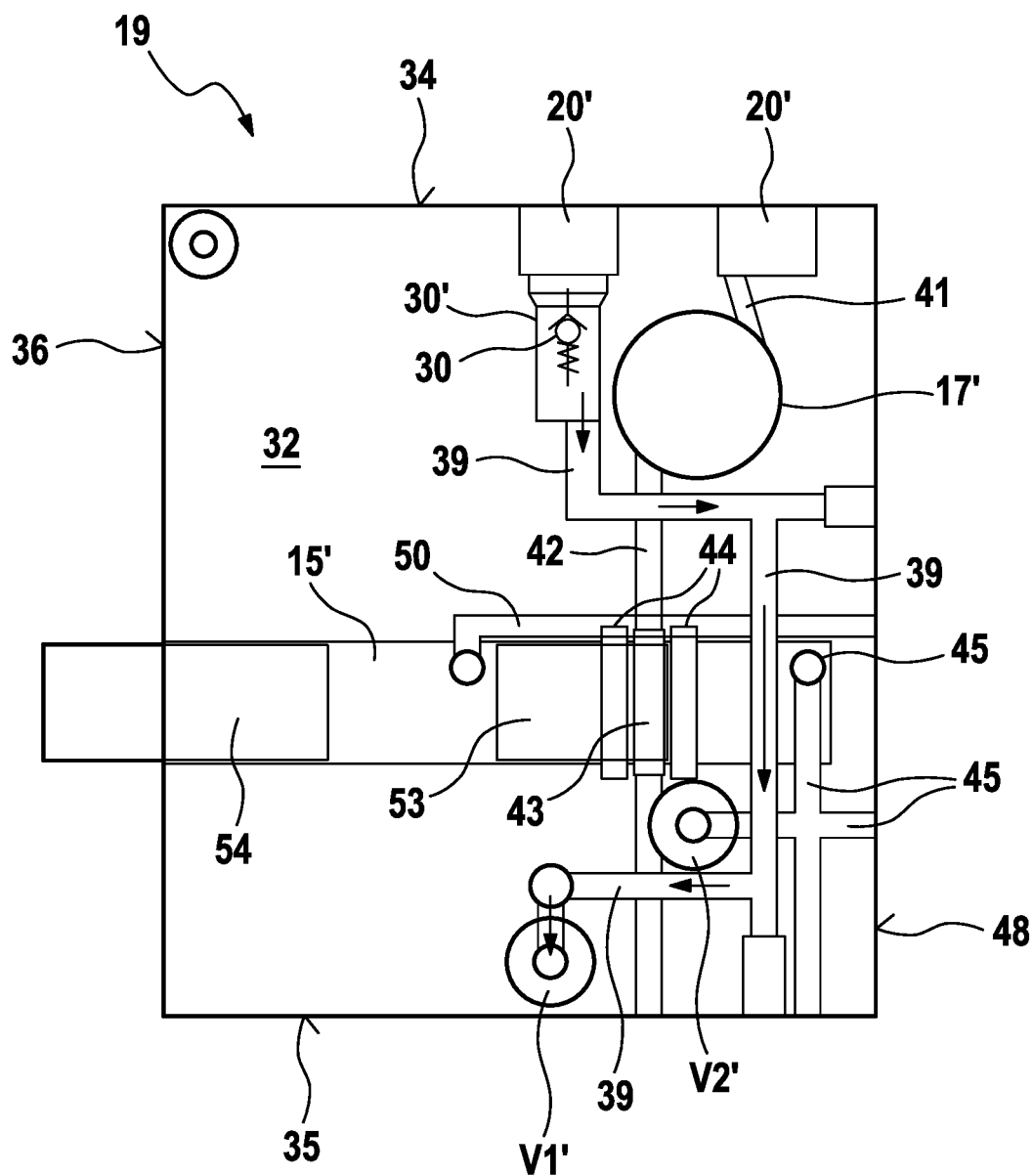
FIGS. 5, 5A, 6 and 7 show parts of a bore of the hydraulic block from FIGS. 3 and 4.

FIG. 5 shows part of the bore of the hydraulic block 19 according to the present invention of the service brake unit 2 of the electrohydraulic power brake system 1. In FIG. 5 and also in FIGS. 6 and 7, the hydraulic block 19 is transparent and only part of the bore of the hydraulic block 19 is shown. FIG. 5 shows a connection of one of the connections 20' for the brake fluid reservoir 20 in the upper side 34 of the hydraulic block 19 with the connection V1' for the one feed line V1 to the secondary brake unit 3. FIG. 5 shows a view of the motor side 32 of the hydraulic block 19, the fastening side 36 being located on the left. A line 39, which is designed as a borehole or as a plurality of boreholes which are at right angles to one another and parallel or perpendicular to the sides of the hydraulic block 19, initially leads coaxially from a base of the connection 20' for the brake fluid reservoir 20 downward between the power cylinder borehole 9' and the cylinder borehole 17' of the pedal travel simulator 17 to the bottom, i.e., as far as a side of the cylinder borehole 17' of the pedal travel simulator 17 which faces the lower side 35 of the hydraulic block 19. Below the cylinder borehole 17', the line 39 extends further in the direction of the narrow side 48 of the hydraulic block 19 which is opposite the fastening side 36, in order to then, below the cylinder borehole 17', bend again at right angles downward in the direction of the lower side 35 of the hydraulic block 19. This part of the line 39 leading downward to the feed line runs past the brake master cylinder borehole 15' on the motor side 32 of the hydraulic block 19. Approximately at a center between the brake master cylinder borehole 15', the line 39 bends again at a right angle back in the direction of the fastening side 36 and then, with a last portion leading downward in the direction of the lower side 35, opens into the connection V1' for the feed line, this connection being located in the motor side 32 of the hydraulic block 19 and close to the lower side 35 approximately at a center between the fastening side 36 and the narrow side 48 opposite thereto.

The check valve 30 shown as a circuit symbol in FIG. 5 on the line 39 leading from the brake fluid reservoir 20 to the feed line is located in a receptacle 30', which as a diameter-reduced extension is arranged coaxially with a base of the blind hole which forms the connection 20' for the brake fluid reservoir 20.

Figure 5A:
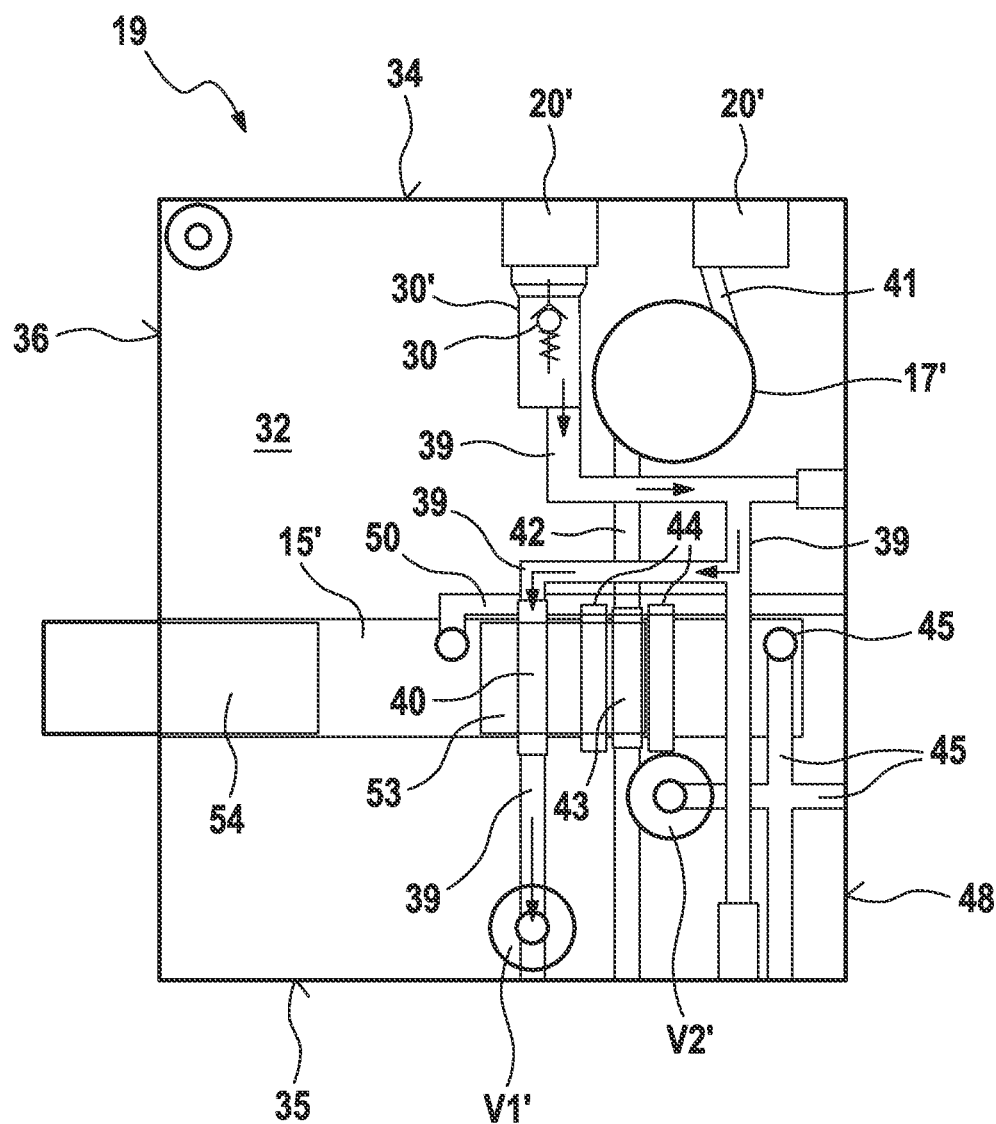

Instead of passing the brake master cylinder borehole 15', the line 39 can from the brake fluid reservoir 20 to the feed line V1, also from the receptacle 20' for the brake fluid reservoir 20 downward in the direction of the brake master cylinder borehole 15', after a bend then parallel to the brake master cylinder borehole 15' in the direction of the narrow side 48 opposite the fastening side 36, after a further bend downward again in the direction of the brake master cylinder borehole 15' and again after a bend parallel to the brake master cylinder borehole 15' back in the direction of the fastening side 36 approximately as far as a center of the hydraulic block 19 between the fastening side 36 and the opposite narrow side 48 of the hydraulic block 19. From there, the line 39 leads right through the brake master cylinder borehole 15' downward to the connection V1' of the feed line V1. In this embodiment of the present invention, the brake master cylinder borehole 15' has an approximately semicircular undercut 40, which at an inner side of the brake master cylinder borehole 15' leads around a brake master cylinder piston/secondary piston 53. This alternative line routing is shown in FIG. 5A. The brake master cylinder piston/secondary piston 53 closes the undercut 40 on its inner side, so that it does not communicate with the brake master cylinder borehole 15'. A brake master cylinder piston/primary piston 54 and the secondary piston 53 are shown schematically in FIGS. 5 and 5A.

For the purpose of what is referred to as "thermal relief", a rear end of a simulator piston (not shown) of the pedal travel simulator 17 communicates with the pressureless brake fluid reservoir 20. The rear end of the simulator piston is the face which is not subjected to pressure when the brake master cylinder 15 is actuated. "Thermal relief" means that brake fluid is not enclosed at the rear end of the simulator piston, but that during an increase in volume during heating, brake fluid is able to flow away from the rear end of the simulator piston into the brake fluid reservoir 20. In the exemplary embodiment, thermal relief of the simulator piston or of the pedal travel simulator 17 is provided by a line 41, which from a base of one of the connections 20' for the brake fluid reservoir 20 in the upper side 34 of the hydraulic block 19 leads downward to the cylinder borehole 17' of the pedal travel simulator 17. In the exemplary embodiment, the line 41 is drilled obliquely, i.e., not parallel or perpendicular to the sides and edges of the hydraulic block 19.

In the exemplary embodiment the connection of a chamber of the brake master cylinder 15—of a secondary chamber, in the exemplary embodiment—to the brake fluid reservoir 20 is effected at the rear end of the simulator piston via the cylinder borehole 17' of the pedal travel simulator 17, from which a line 42 leads downward to a peripheral groove 43 of the brake master cylinder borehole 15', which encloses a brake master cylinder piston (not shown), which, in the exemplary embodiment, is referred to as a secondary piston or floating piston. With respect to the brake master cylinder piston, the groove 43 is sealed on both sides by sealing rings (not shown), which are arranged in peripheral sealing grooves 44 of the brake master cylinder borehole 15' on both sides of the groove 43. As the brake master cylinder piston moves over the groove 43 when the brake master cylinder 15 is actuated, it separates the brake master cylinder 15 hydraulically from the brake fluid reservoir 20, so that a brake pressure in the brake master cylinder 15 is generated when the brake master cylinder piston is displaced further.

A first venting line 45 for the brake master cylinder 15 is connected to the brake master cylinder borehole 15 at a peripheral point facing the upper side 34 of hydraulic block 19. This means that the venting line 45 opens at the top into the brake master cylinder borehole 15' when the hydraulic block 19 is arranged as intended with its upper side 34 upward. Air bubbles possibly contained in the brake fluid collect there, as a result of which the brake master cylinder 15 can be vented. In the exemplary embodiment, the first venting line 45 leads tangentially from the peripheral point of the brake master cylinder borehole 15' facing the upper side 34 of the hydraulic block 19 in the direction of the motor side 32 and after a bend onward and downward between the motor side 32 and the brake master cylinder borehole 15' until after a further bend in the direction of the fastening side 36 it leads into one of the two connections V2' for the feed line to the secondary brake unit 3. In the exemplary embodiment, the venting line 45 opens into the secondary chamber of the brake master cylinder 15. Between its two bends, the first venting line 45 extends obliquely to the motor side 32 and to the valve side 33; it is located at the level of the brake master cylinder borehole 15' close to the motor side 32 and close to the lower side 35 of the hydraulic block 19 close to the valve side 32. The present invention does not exclude a course of the venting line 45 that is parallel to or perpendicular to the sides and edges of the hydraulic block 19.

For a possible venting of a primary chamber of the brake master cylinder 15, a second venting line 50 is arranged in parallel with and close to the brake master cylinder borehole 15' in the hydraulic block 19, said venting line opening at the narrow side 48 of the hydraulic block 19 which is opposite the fastening side 36. The second venting line 50 is located approximately at the level of the peripheral point of the brake master cylinder borehole 15' facing the upper side 34 of the hydraulic block 19 on a side of the brake master cylinder borehole 15' facing the motor side 32 and, after a bend, opens into the brake master cylinder borehole 15' tangentially at the peripheral point facing the upper side 34 of the hydraulic block 19. The second venting line 50 crosses the line 39, which connects the connection 20' for the brake fluid reservoir 20 to the connection V1' for the feed line V1 to the secondary brake unit 3.

Close to the fastening side 36, a receptacle 21' for the test valve 21 is arranged on a lower side of the brake master cylinder borehole 15' in the valve side 33 of the hydraulic block 19 (see FIG. 6). An axis of the receptacle 21' for the test valve 21 extends tangentially to a peripheral point of the brake master cylinder borehole 15', which point faces the lower side 35 of the hydraulic block 19. In the exemplary embodiment, a connection of the test valve 21 to the brake fluid reservoir 20 is effected by a line routing which is complex due to the bore of the hydraulic block 19: a line 46 initially leads from one base of one of the connections 20' for the brake fluid reservoir 20 in the upper side of the hydraulic block 34 downward to a groove 47 which encloses the piston 6 of the power brake pressure generator 10 in the power cylinder borehole 9. The groove 47 is sealed on both sides with sealing rings to the piston 6 of the power brake pressure generator 10, so that the line 46 does not communicate with the cylinder 9 of the power brake pressure generator 10. From the groove 47, the line 46 leads onward in the direction of the narrow side 48 of the hydraulic block 19 which is opposite the fastening side 36, and after a bend leads downward into the groove 43 surrounding the brake master cylinder piston in the brake master cylinder borehole 15', which groove, as described above, communicates with the receptacle 21' for the test valve 21.

What is claimed is:

1. A hydraulic block for a service brake unit of a hydraulic power brake system for an autonomously driving motor vehicle, comprising:
    an upper side configured for mounting a brake fluid reservoir and having connections for a brake fluid reservoir;
    a fastening side which adjoins the upper side and is configured for fastening the hydraulic block to a bulkhead of the motor vehicle and in which a brake master cylinder borehole opens;
    a motor side which adjoins the upper side and the fastening side and on which an electric motor can be arranged for driving a piston of a power brake pressure generator, and in which connects to a connection of hydraulic wheel brakes and to a connection of a secondary brake unit via brake lines to the service brake unit in the motor side;
    wherein a power cylinder borehole is arranged in the motor side of the hydraulic block between the upper side and the brake master cylinder borehole, and
    wherein the hydraulic block has: i) a connection for the secondary brake unit which is arranged, from an axis of the power cylinder borehole, at an angle of approximately 45° to the upper side of the hydraulic block on a side of the power cylinder borehole facing away from the fastening side of the hydraulic block, and/or ii) a connection for the secondary brake unit near a lower side in the motor side of the hydraulic block opposite the upper side.

2. The hydraulic block according to claim 1, wherein one of the connections for the brake fluid reservoir in the upper side of the hydraulic block has a concentric receptacle for a check valve, from which receptacle a line in the hydraulic block leads to one of the connections for the secondary brake unit.

3. The hydraulic block according to claim 2, wherein the line from the receptacle for the check valve leads laterally past the power cylinder borehole, after a bend under a cylinder borehole of a pedal travel simulator leads away from the fastening side, after a further bend under the cylinder borehole of the pedal travel simulator leads laterally past the brake master cylinder borehole onward in a direction of the lower side of the hydraulic block, and after another bend leads back in a direction of the fastening side of the hydraulic block up to the one of the connections for the secondary brake unit, which is arranged close to the lower side in the motor side of the hydraulic block.

4. The hydraulic block according to claim 1, wherein the brake master cylinder borehole has a helical groove that is part of a line in the hydraulic block, which connects one of the connections for the brake fluid reservoir in the upper side of the hydraulic block to one of the connections for the secondary brake unit in the motor side of the hydraulic block.

5. The hydraulic block according to claim 1, wherein a line from one of the connections for the brake fluid reservoir leads to a rear end of a simulator piston and into a cylinder borehole for a pedal travel simulator.

6. The hydraulic block according to claim 1, wherein a line from a cylinder borehole of a pedal travel simulator leads to a groove surrounding a brake master cylinder piston in the brake master cylinder borehole.

7. The hydraulic block according to claim 1, wherein a venting line communicates with the brake master cylinder borehole at a peripheral point facing the upper side of the hydraulic block.

8. The hydraulic block according to claim 1, wherein one of the connections for the secondary brake unit is arranged close to the upper side in the motor side of the hydraulic block, a line leads from there in a direction of the fastening side of the hydraulic block and after a bend close to the fastening side in a direction of the lower side of the hydraulic block leads to a receptacle for an isolating valve which is arranged approximately at a same height as the axis of the power cylinder borehole in a valve side of the hydraulic block opposite the motor side.

9. The hydraulic block according to claim 8, wherein from the connection for the secondary brake unit close to the lower side in the motor side of the hydraulic block, a line leads away from the fastening side and after a bend leads upward to a receptacle for an isolating valve in the valve side of the hydraulic block.

* * * * *